(12) United States Patent
Jones

(10) Patent No.: US 7,314,207 B2
(45) Date of Patent: Jan. 1, 2008

(54) UTILITY POLE SUPPORT STAND

(75) Inventor: Michael D. Jones, Neosho, MO (US)

(73) Assignee: Tru 2 Form Ventures, Inc., Neosho, MO (US)

( * ) Notice: Subject to any disclaimer, the term of this patent is extended or adjusted under 35 U.S.C. 154(b) by 59 days.

(21) Appl. No.: 10/980,376

(22) Filed: Nov. 3, 2004

(65) Prior Publication Data

US 2006/0091279 A1 May 4, 2006

(51) Int. Cl.
F16M 1/00 (2006.01)

(52) U.S. Cl. ............... 248/676; 248/167; 182/182.3

(58) Field of Classification Search ............. 248/151, 248/156, 164, 166, 167, 676, 677, 678, 671; 52/514.5, 726.4; 182/182.3, 186.3, 153
See application file for complete search history.

(56) References Cited

U.S. PATENT DOCUMENTS

| 291,605 | A | | 1/1884 | Knox | |
|---|---|---|---|---|---|
| 358,836 | A | * | 3/1887 | Casler | 248/167 |
| 391,629 | A | | 10/1888 | McGovern | |
| 1,266,316 | A | | 5/1918 | Raymond | |
| 1,715,603 | A | | 6/1929 | Kamman | |
| 2,056,883 | A | * | 10/1936 | Armond | 414/23 |
| 2,572,205 | A | * | 10/1951 | Shanks | 248/188.6 |
| 3,112,037 | A | * | 11/1963 | Thiermann | 414/23 |
| 3,236,398 | A | * | 2/1966 | Thiermann | 414/23 |
| 3,934,676 | A | * | 1/1976 | Rice | 182/182.3 |
| RE30,020 | E | | 6/1979 | Spencer | |
| 4,278,148 | A | * | 7/1981 | Daley et al. | 182/186.3 |
| 4,386,678 | A | | 6/1983 | Wendell | |
| D280,687 | S | | 9/1985 | Baldridge | |
| 5,143,175 | A | | 9/1992 | Tomko | |
| 5,377,779 | A | * | 1/1995 | Slapnicka | 182/153 |
| 5,524,408 | A | * | 6/1996 | Richey | 52/514.5 |
| 6,505,429 | B2 | * | 1/2003 | Percival | 42/94 |
| 2003/0089073 | A1 | | 5/2003 | Enns | |
| 2004/0001747 | A1 | | 1/2004 | Rajewski | |

* cited by examiner

Primary Examiner—Carl D. Friedman
Assistant Examiner—Tan Le
(74) Attorney, Agent, or Firm—Wood, Herron & Evans, LLP

(57) ABSTRACT

A stand for supporting one end of an elongate structural member, such as a utility pole, a distance off of the ground includes first and second pairs of legs and a cradle configured to engage a circumference of the elongate structural member. The first and second pairs of legs are movable relative to one another, from a nested configuration to a working configuration. In the nested configuration, the second legs are positioned generally between the first legs so that the stand has a generally flat profile that is convenient for storage and transporting the stand to a work site. The legs can be moved to the working configuration when it is desired to support a utility pole or other elongate structural member thereon.

10 Claims, 4 Drawing Sheets

UTILITY POLE SUPPORT STAND

FIELD OF THE INVENTION

The present invention relates to support structures, and more particularly a stand for supporting an end of a utility pole off of the ground.

BACKGROUND OF THE INVENTION

Transmission and distribution lines for power, telephone, cable, and other utilities are often supported above ground level by utility poles. The poles may be made from wood, steel, aluminum, polymer, concrete or other materials. Conventional installation of utility poles involves transporting the poles to a worksite, preparation of the poles to support the lines, excavating holes in the ground, and placing the poles in the excavated holes. Due to the size and weight of utility poles, much of the labor involved in placing the poles in their respective holes is performed by service vehicles or trucks outfitted with implements for handling the utility poles. The trucks are also outfitted with augers useful for excavating the holes into which the utility poles are placed.

The preparation of utility poles to support transmission and distribution lines involves mounting various accessories onto the poles. While the accessories can be mounted to the poles with the poles laying flat on the ground, the low position of the poles on the ground is not ergonomic and is therefore inconvenient for persons installing the accessories onto the poles. Accordingly, installers typically prefer to utilize the implements on the service truck to support at least one end of the poles a distance off of the ground surface so that the various accessories can be easily mounted to the poles. When the service truck is used in this manner, however, the truck cannot be used to evacuate holes or install poles into the holes. Accordingly, work typically proceeds at a relatively slow pace while the service truck is being used to support utility poles while accessories are added. The overall result is that resources and equipment are not utilized to their full potential. A need therefore exists for a system that permits service personnel to effectively and ergonomically mount accessories to utility poles without requiring the use of the service vehicle so that equipment and manpower can be utilized to their full potential and installation of the poles can proceed at an efficient pace.

SUMMARY OF THE INVENTION

The present invention provides a utility support stand that can be used to support at least one end of a utility pole a convenient height above a ground surface so that service personnel can ergonomically and efficiently mount various accessories to the pole. The stand is relatively light-weight and is foldable to a relatively flat configuration that facilitates storage and transportation to a work site. In one embodiment, the utility support stand includes first and second pairs of spaced-apart, downwardly-extending legs. The first and second legs are positionable relative to one another from a nested configuration wherein the second legs are disposed between the first legs and wherein the stand has a generally flat profile, and a working configuration wherein the second legs are oriented approximately 90° to the first legs.

A cradle is mounted atop the first and second legs and has first and second ends extending upwardly relative to the legs to engage the circumference of a utility pole supported thereon. The utility support stand supports the weight of the utility pole and the cradle prevents the pole from rolling off of the stand. The stand may be positioned anywhere along the length of the pole, between its ends, so that the height of the end supported off of the ground may be adjusted as desired by a user. Strength and stability of the stand is improved by cradle braces extending between the first and second ends of the cradle and the legs, and by a crossmember extending between the second legs. In another embodiment, the stand further includes at least one stop member coupled to the first legs for positioning the second legs in at least one of the nested configuration and the working configuration.

In another embodiment, a method of preparing a utility pole includes supporting the utility pole on a stand such that at least one end of the pole is positioned above a ground surface, mounting at least one accessory to the utility pole, forming a hole in the ground surface for receiving an end of the utility pole, and placing the utility pole in the hole.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
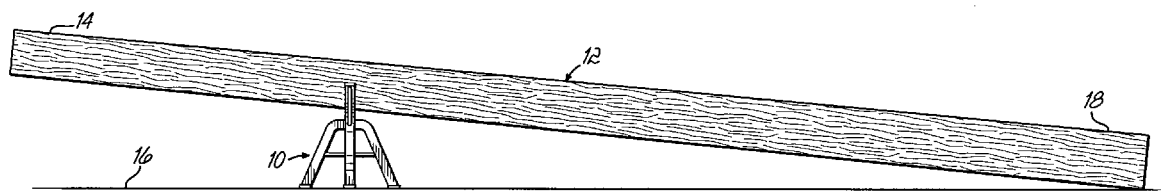
FIG. 1 is an elevation view depicting an exemplary stand according to the present invention being used to support a utility pole.
Figure 2:
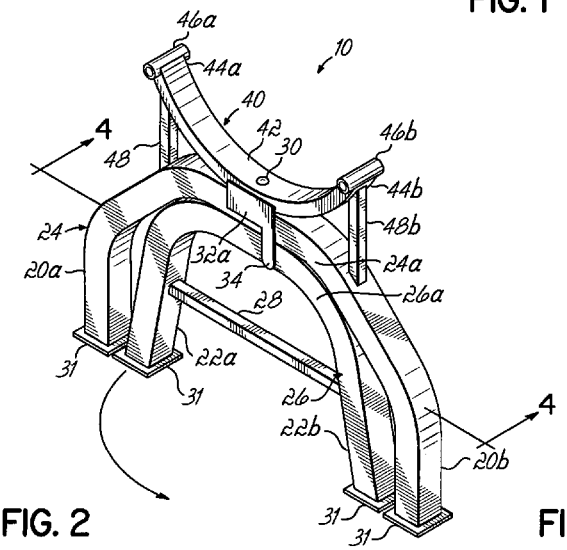
FIG. 2 is a perspective view of the stand of FIG. 1, depicted in a nested configuration.
Figure 3:
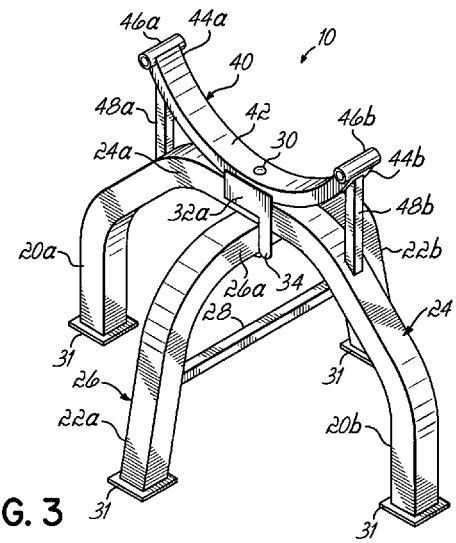
FIG. 3 is a perspective view of the stand of FIG. 2, shown in a working configuration.

FIG. 1 depicts an exemplary utility support stand 10 in accordance with the present invention, supporting a utility pole 12 such that a first end 14 of the pole 12 is raised a distance above a ground surface 16. The second end 18 of the utility pole 12 rests upon the ground surface 16. Referring now to FIGS. 2 and 3, the stand 10 of FIG. 1 is described in more detail. In this embodiment, the stand 10 includes a pair of spaced-apart, downwardly-extending first legs 20a, 20b and a pair of spaced-apart, downwardly-extending second legs 22a, 22b. The second legs 22a, 22b are positionable relative to the first legs 20a, 20b from a nested configuration, depicted in FIG. 2, to a working configuration, depicted in FIG. 3. In the nested configuration, the second legs 22a, 22b are disposed generally between the first legs 20a, 20b such that the stand 10 has a relatively flat, planar, profile convenient for storage and transportation of the stand 10.

In the embodiment, shown, the first and second pairs of legs 20a, 20b, 22a, 22b are coupled for relative pivotal movement whereby the second legs 22a, 22b may be angularly positioned relative to the first legs 20*a*, 20*b* anywhere between the nested configuration, shown in FIG. 2 and the working configuration, shown in FIG. 3. In the working configuration, a plane extending between the second legs forms an angle of approximately 90° with a plane extending between the first legs.

Figure 4:
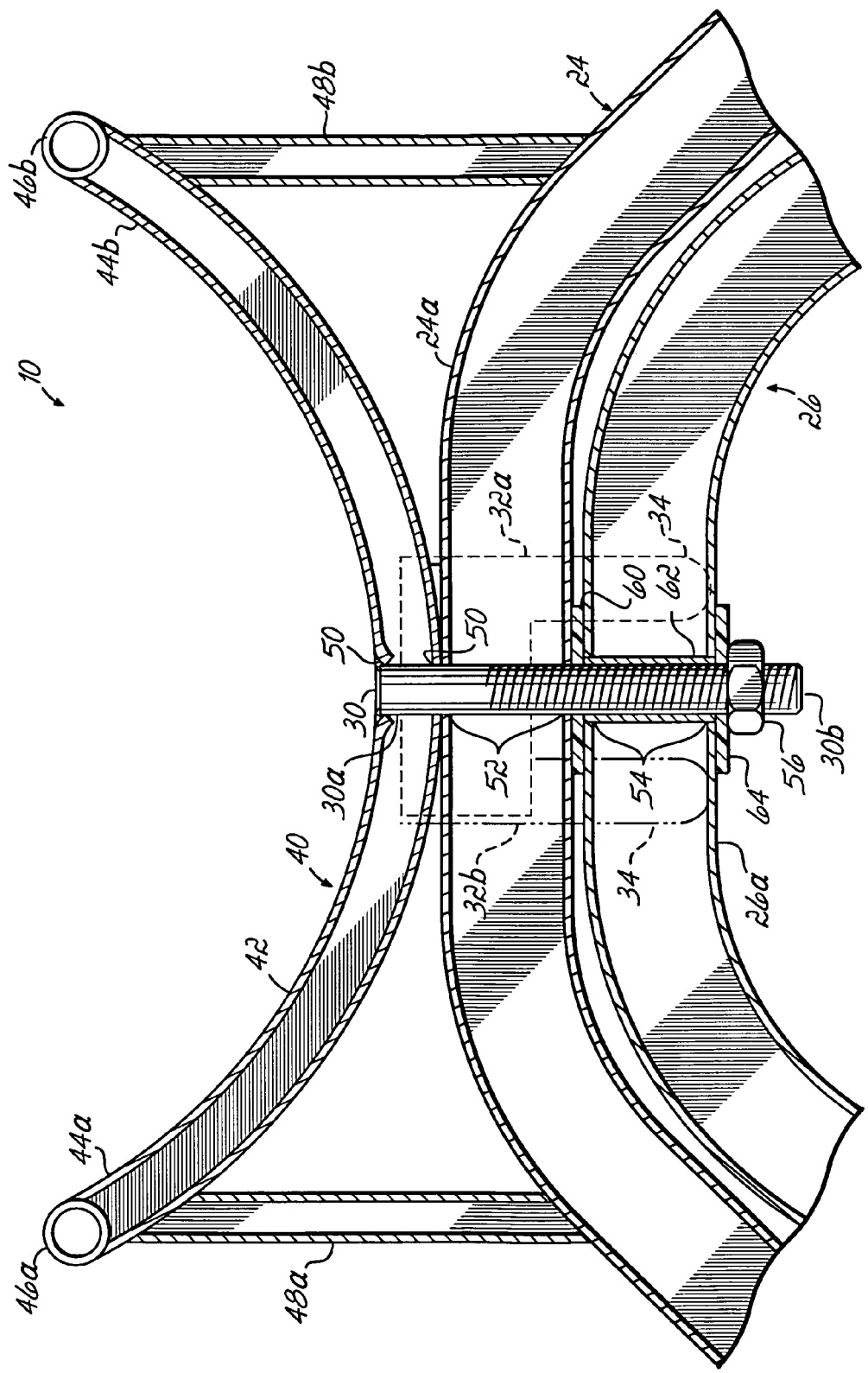
FIG. 4 is a cross-sectional view of the stand of FIG. 2, taken along line 4-4.

In the embodiment shown, the first and second pairs of legs are formed by first and second unitary, tubular leg members 24, 26 bent into generally arcuate shapes to define the respective legs. The second leg member 26 is formed into a smaller arcuate shape than the first leg member 24 so that it fits generally between the legs of the first leg member 24. A cross member 28 extends between the second legs 22*a*, 22*b*. The first and second leg members 24, 26 are coupled together at their respective intermediate portions 24*a*, 26*a* by a rod member 30 extending through holes formed through the intermediate portions, as depicted in FIG. 4 and described more fully below. The ends of the first and second leg members 24, 26 are capped with foot plates 31 formed from flat, metal plates that are welded, brazed or otherwise secured to the respective ends of the first and second legs 20*a*, 20*b*, 22*a*, 22*b*. The foot plates 31 contribute to the stability of the support stand 10 and help to prevent the first and second legs from digging into the ground surface.

The stand 10 further includes a pair of stop members 32*a*, 32*b* (only one visible in FIGS. 2 and 3) disposed on opposite sides of the first legs 20*a*, 20*b* to facilitate positioning the second legs 22*a*, 22*b* in the nested and working configurations. In the embodiment shown, the stop members 32*a*, 32*b* comprise generally rectangular plates affixed to opposite sides of the first leg member 24. The stop members 32*a*, 32*b* further include downwardly extending arms 34, offset from the center of the stand 10 and positioned to engage one of the second legs 22*a*, 22*b* when the second legs are pivoted toward the working configuration. The arms 34 also contact the intermediate portion 26*a* of the second leg member 26 when the second legs are pivoted to the nested configuration, as best shown in FIG. 2. In the embodiment shown, the arms 34 on each respective stop member 32*a*, 32*b* are located diagonally opposite one another on the respective sides of the intermediate portion 24*a* of first leg member 24, as depicted by the hidden lines in FIGS. 4 and 5.

While the stop members 32*a*, 32*b* are shown and described herein as plates with downwardly extending arms, it will be recognized that the stop members may have other configurations, such as detents formed integrally with the first and second leg members 24, 26, or any other configuration suitable to facilitate positioning the first and second legs 20*a*, 20*b*, 22*a*, 22*b* in the nested and working configurations.

The utility support stand 10 further includes a cradle 40 fixed atop the first leg member 24 for supporting a utility pole 12, or other elongate, structural member, thereon. In the embodiment shown, the cradle 40 is formed from an elongate tubular member 42 bent in a generally arcuate shape. The cradle 40 is secured to the top of the first leg member 24 such that first and second ends 44*a*, 44*b* of the elongate member 42 are aligned with the first leg member 24 and extend generally upwardly relative to the downwardly extending first legs 20*a*, 20*b*. In the embodiment shown, the cradle 40 further includes end pieces 46*a*, 46*b* formed from segments of round tube attached to the respective ends.

The arcuate shape of the cradle 40 is sized to engage the circumference of an elongate structural member, such as a utility pole 12, so that the stand 10 can stably support a first end 14 of the utility pole 12 above the ground surface 16 while the cradle 40 retains the utility pole 12 atop the stand.

The cradle 40 is reinforced by first and second braces 48*a*, 48*b* extending between the first legs 20*a*, 20*b* and the respective first and second ends 44*a*, 44*b* of the elongate member 42. The elongate member 42, end pieces 46*a*, 46*b*, and first and second cradle braces 48*a*, 48*b* may be secured together and to the first leg member 24 by welding, brazing, riveting, or any other method suitable to securely affix these components to the first leg member 24.

Referring now to FIG. 4, the cradle 40 and the first and second leg members 24, 26 are coupled together by a rod member 30 extending through respective apertures 50, 52, 54 formed through the elongate member 42 of the cradle 40, and through the intermediate portions 24*a*, 26*a* of the first and second leg members 24, 26. A first end 30*a* of the rod member 30 is staked and welded to the cradle 40 and the second end 30*b* of the rod member 30 is threaded to receive a nut 56 for securing the cradle 40 and the first and second leg members 24, 26 together. To ensure relative pivotal operation of the first and second leg members 24, 26 without binding on the rod member 30, a spacer washer 60 is disposed between the first and second leg members 24, 26 and a spacer tube 62 extends through the second leg member 26. In one embodiment, the spacer tube 62 is formed from 1-inch outside diameter steel pipe that is welded to the second leg member 26, and the spacer washer 60 is a 0.125-inch thick Teflon® washer. It will be recognized, however, that other materials may be used for the spacer washer and spacer tube to facilitate pivotal movement of the second legs 22*a*, 22*b* with respect to the first legs 20*a*, 20*b*.

An end washer 64 is fitted over the rod member 30, adjacent the second leg member 26, and the nut 56 is threaded over the second end 30*b* of the rod member 30 to clamp the spacer tube 62 between the spacer washer 60 and the end washer 64 without binding the first and second leg members. In one embodiment, the rod member 30 has a ¾-inch outside diameter, the end washer 64 is a 0.125-inch-thick metal washer, and the nut 56 is a nylon bushing locknut with threads corresponding to the threads formed onto the second end 30*b* of the rod member 30.

In this embodiment, the first and second leg members 24, 26 are formed from 2-inch square tube having a wall thickness of 0.125 inch. The footpads 31 are formed from 0.25-inch-thick cold-rolled steel plate and the stop members 32*a*, 32*b* are formed from 0.125-inch-thick cold-rolled steel plate. The elongate member 42 of the cradle is 40 formed from 1-inch by 2-inch rectangular tubing with a 0.125-inch wall thickness and the end pieces 46*a*, 46*b* are 3-inch-long pieces of black pipe having 1-inch outer diameters. The cross member 28 and the cradle braces 48*a*, 48*b* are formed from 0.75-inch square tube.

Figure 5:
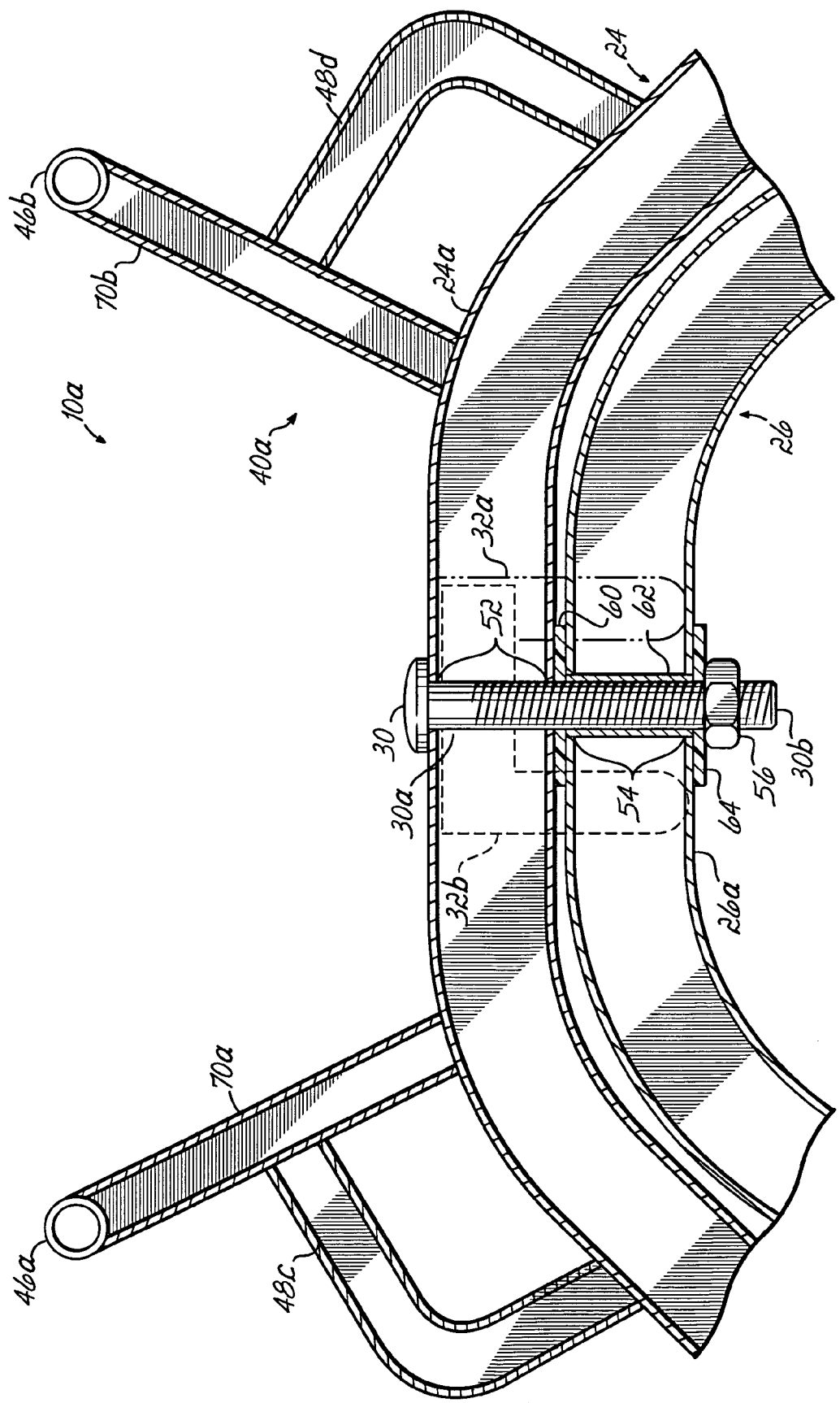
FIG. 5 is a cross-sectional view, similar to FIG. 4, depicting another embodiment of a stand according to the present invention.

FIG. 5 depicts another embodiment of a utility support stand 10*a* according to the present invention and constructed in a manner similar to stand 10 described above. Accordingly, like features have been similarly numbered. Rod member 30 of stand 10*a* comprises a conventional carriage bolt. The rod member 30 extends through the apertures 52, 54 formed through the first and second leg members 24, 26, as described above, and receives the nut 56 over its threaded second end 30*b*. In this embodiment, the rod member is a ¾-inch diameter, 6-inch-long, Grade 5 carriage bolt.

The utility support stand 10*a* shown in FIG. 5 further includes a cradle 40*a* comprising first and second spaced-apart, elongate cradle legs 70*a*, 70*b* secured, such as by welding or other suitable methods, to opposite ends of the intermediate portion 24*a* of the first leg member 24. The cradle legs 70*a*, 70*b* are angularly disposed with respect to one another, with their upper ends extending in opposite directions, such that they cooperate with the intermediate portion 24a to receive the circumference of a utility pole 12 therebetween. Stand 10a also includes first and second angled cradle braces 48c, 48d having generally L-shape configurations. The cradle braces 48c, 48d are secured between the cradle legs 70a, 70b and the first legs 20a, 20b in a manner similar to the cradle braces 48a, 48b described above with respect to utility stand 10. The angled shape of the cradle braces 48c, 48d provides a convenient handle for grasping and carrying the stand 10a.

Figure 6:
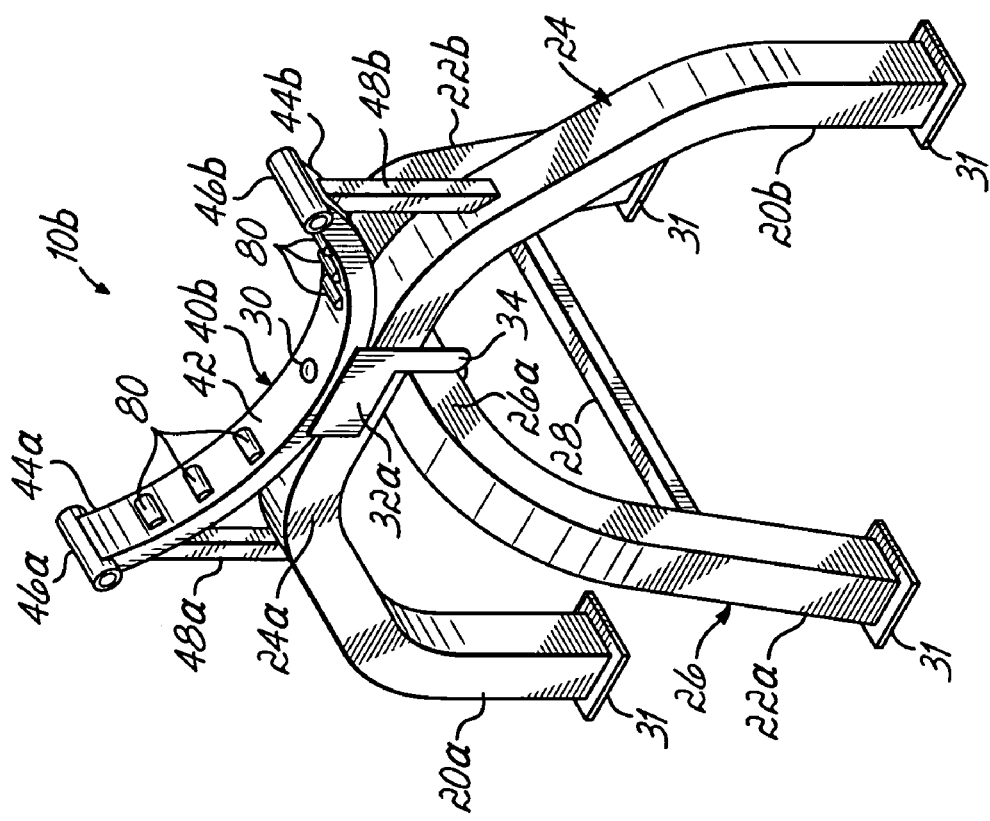
FIG. 6 is a perspective view of another embodiment of a stand according to the present invention.

FIG. 6 depicts another embodiment of a utility support stand 10b, similar to stand 10 shown and described above with respect to FIGS. 1-4. Similar features have been similarly numbered. The utility support stand 10b further includes rollers 80 coupled to cradle 40b, with their respective axes of rotation aligned to facilitate rotation of a utility pole 12, or other elongate structural member, such as a pipe or a signage post, about its longitudinal axis while supported on the stand 10b.

In the embodiments shown, the utility support stand 10, 10a, 10b is formed from a rod member and off-the-shelf tube plate materials which are cut, bent, and joined together as described above. It will be recognized that the stand 10, 10a, 10b may alternatively be formed from other materials, such as solid materials instead of tubular materials, or from polymeric materials, ceramics, or other materials which are suitable to form the stand. The assembled stand 10, 10a, 10bmay be painted, powder coated, or otherwise finished to provide an aesthetically pleasing appearance and to reduce environmental effects on the stand.

In use, the stand 10, 10a, 10b is transported to a work site in the nested configuration. To support a utility pole or other elongate structure off of the ground, the second legs 22a, 22b are pivoted from the nested configuration to the working configuration and the stand 10, 10a, 10b is placed on a stable ground surface 16. A utility pole 12 is laid across the stand 10, 10a, 10b so that the cradle 40, 40a, 40b engages the circumference of the pole 12 and one end 14 of the pole overhangs the cradle 40, 40a, 40b and is thereby supported a distance above the ground surface 16. The desired height of the end 14 above the ground surface 16 can be adjusted by positioning the stand 10, 10a, 10b at different locations along the length of the pole 12. With the end 14 of the pole 12 supported in this manner, various accessories can be added to the pole 12 in an efficient and ergonomic manner without utilizing implements on a service truck. Accordingly, the service truck can be used to perform other tasks, such as excavating holes or placing finished utility poles in the excavated holes, while technicians are preparing poles supported on stands 10, 10a, 10b.

While the exemplary utility support stand 10, 10a, 10b has been shown and described above for use with a utility pole 12, to support an end of the utility pole 12 off of the ground, it will be recognized that the stand 10, 10a, 10b may alternatively be used to support other elongate structures off of the ground. For example, a stand according to the invention may be used to support a segment of a pipe or a signage post off of the ground to facilitate preparing or servicing the pipe or post in a manner similar to that described above. These alternative structures are merely exemplary and are not intended to limit the various possible structures that could be supported by a stand in accordance with the present invention. It will also be recognized that two or more stands may be used together to support an elongate structure wholly off of the ground, as may be desired.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A utility support stand, comprising:
a pair of spaced apart, downwardly extending first legs;
a pair of spaced apart, downwardly extending second legs;
said second legs positionable relative to said first legs, from a nested configuration wherein said second legs are disposed between said first legs and a plane extending between said second legs is substantially aligned with a plane extending between said first legs, and a working configuration wherein said second legs are positioned between said nested configuration and an orientation wherein said plane extending between said second legs forms an angle of approximately 90 degrees with said plane extending between said first legs;
a cradle atop said first and second legs and fixed in alignment with said first legs, said cradle including first and second oppositely disposed ends extending upwardly relative to said downwardly extending legs, said cradle sized to engage the circumference of a an elongate structural member such that that the elongate structural member is received between said first and second ends; and
a cross member extending between said second legs.

2. The utility support stand of claim 1, wherein said cradle is sized to engage the circumference of a utility pole.

3. The utility support stand of claim 1, wherein said first and second pairs of legs are coupled for relative pivotal movement.

4. The utility support stand of claim 1, wherein said cradle comprises an elongate member having an arcuate shape.

5. The utility support stand of claim 1, further comprising first and second cradle braces, each said cradle brace extending between one of said first legs and one of said first and second ends of said cradle.

6. The utility support stand of claim 1, further comprising at least one stop member coupled to said first legs and operative to position said second legs in at least one of said nested configuration and said working configuration.

7. The utility support stand of claim 6, comprising two stop members, said stop members positioned on opposite sides of said first legs and spaced apart to facilitate positioning said second legs between said nested configuration and said working configuration.

8. The utility support stand of claim 1, wherein each of said first legs and said second legs are integrally formed.

9. The utility support stand of claim 1, further comprising at least one roller coupled to said cradle and configured to facilitate rotating an elongate structural member about a longitudinal axis thereof, while the structural member is supported on the stand.

10. A utility pole installation, comprising:
a utility pole having first and second ends; and a stand positioned between said first and second ends of said utility pole and supporting at least one of said first and second ends off of a ground surface, said stand comprising:
a pair of spaced apart, downwardly extending first legs,
a pair of spaced apart, downwardly extending second legs,
said second legs positionable relative to said first legs, from a nested configuration wherein said second legs are disposed between said first legs and a plane extending between said second legs is substantially aligned with a plane extending between said first legs, and a working configuration wherein said second legs are positioned between said nested configuration and an orientation wherein said plane extending between said second legs forms an angle of approximately 90 degrees with said plane extending between said first legs, and
a cradle disposed atop said first and second legs, said cradle including first and second oppositely disposed ends extending upwardly relative to said downwardly extending legs.

* * * * *

UNITED STATES PATENT AND TRADEMARK OFFICE
CERTIFICATE OF CORRECTION

PATENT NO. : 7,314,207 B2  
APPLICATION NO. : 10/980376  
DATED : January 1, 2008  
INVENTOR(S) : Michael D. Jones Page 1 of 1

It is certified that error appears in the above-identified patent and that said Letters Patent is hereby corrected as shown below:

<u>Column 4</u>

Line 45, change "is 40" to --40 is--.

<u>Column 5</u>

Line 28, "*b*may" should be --may--.

<u>Column 6</u>

Line 33, change "an an" to --an--.

Line 34, delete the second occurrence of "that".

Signed and Sealed this

Nineteenth Day of August, 2008

JON W. DUDAS  
*Director of the United States Patent and Trademark Office*